US007092435B2

(12) United States Patent
Saruwatari

(10) Patent No.: US 7,092,435 B2
(45) Date of Patent: Aug. 15, 2006

(54) LINE QUALITY MONITORING APPARATUS AND METHOD

(75) Inventor: Eiji Saruwatari, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 779 days.

(21) Appl. No.: 10/084,311

(22) Filed: Feb. 28, 2002

(65) Prior Publication Data

US 2002/0149813 A1 Oct. 17, 2002

(30) Foreign Application Priority Data

Mar. 1, 2001 (JP) ............................. 2001-057125

(51) Int. Cl.
*H04B 17/00* (2006.01)
(52) U.S. Cl. .................. 375/227; 375/317; 398/26; 398/27; 398/38
(58) Field of Classification Search ............... 375/224, 375/292, 222; 714/704, 705, 745; 398/162, 398/136, 9, 27, 1, 16, 157, 209, 26, 202, 398/207, 38, 208, 131; 356/73.1; 704/233; 379/56.3, 416, 392.01; 455/296, 570
See application file for complete search history.

(56) References Cited

U.S. PATENT DOCUMENTS

| 4,241,236 | A | * | 12/1980 | Nash | 379/56.3 |
|---|---|---|---|---|---|
| 4,700,392 | A | * | 10/1987 | Kato et al. | 704/233 |
| 5,191,462 | A | * | 3/1993 | Gitlin et al. | 398/209 |
| 5,425,033 | A | * | 6/1995 | Jessop et al. | 714/704 |
| 6,008,916 | A | * | 12/1999 | Khaleghi | 398/27 |
| 6,069,718 | A | * | 5/2000 | Khaleghi | 398/27 |
| 6,246,499 | B1 | * | 6/2001 | Kunito et al. | 398/162 |
| 6,275,959 | B1 | * | 8/2001 | Ransijn | 714/705 |
| 6,480,315 | B1 | * | 11/2002 | Brown | 398/202 |
| 6,513,136 | B1 | * | 1/2003 | Barker | 714/704 |
| 2003/0202805 | A1 | * | 10/2003 | Taga et al. | 398/202 |

FOREIGN PATENT DOCUMENTS

| JP | 2-73748 | 3/1990 |
|---|---|---|
| JP | 2-142247 | 5/1990 |
| JP | 3-140039 | 6/1991 |
| JP | 7-15355 | 1/1995 |
| JP | 8-265273 | 10/1996 |
| JP | 10-126349 | 5/1998 |
| JP | 2000-4260 | 1/2000 |

(Continued)

OTHER PUBLICATIONS

Smart optical receiver with automatic decision threshold setting and retiming phase alignment□□Kawai, M. et al; Lightwave Technology, Journal of□□vol. 7, Issue 11, Nov. 1989 pp. 1634-1640□□.*

(Continued)

*Primary Examiner*—Mohammed Ghayour
*Assistant Examiner*—Jacob Meek
(74) *Attorney, Agent, or Firm*—Finnegan, Henderson, Farabow, Garrett & Dunner, L.L.P.

(57) ABSTRACT

In a line quality monitoring method of detecting a code error rate by identifying a received optical signal using different identification levels and executing bit comparison after identification, an amplitude of the signal and noise power contained in the signal are detected, and a difference between the different identification levels is controlled to be inversely proportional to the amplitude of the signal and to be proportional to the noise power of the signal. Alternatively, the amplitude of the signal is controlled to be constant and the difference between the different identification levels is controlled to be proportional to the noise power of the signal.

18 Claims, 15 Drawing Sheets

FOREIGN PATENT DOCUMENTS

JP          2000-22765          1/2000

OTHER PUBLICATIONS

V Pon receiver IC with a high-speed ATC circuit□□Ide, S. et al; High Performance Electron Devices for Microwave and Optoelectronic Applications, 1997. EDMO. 1997 Workshop on Nov. 24-25 1997 pp. 141-146.*

High-speed optical receiver with soft decision ISI cancellation□□Pi Yang Chiang; Ming-Seng Kao; Lightwave Technology, Journal of□□vol. 11, Issue 2, Feb. 1993 pp. 343-350 □□.*

An adaptive decision threshold control of the optical receiver for multi-gigabit terrestrial DWDM transmission systems□□Matsumoto, Y. et al; Optical Fiber Communication Conference and Exhibit, 2001. OFC 2001□□vol.2, 2001 pp. TuR2-1-TuR2-3 vol. 2.*

Inherent transmission capacity penalty of burst-mode receiver for optical multiaccess networks Chao Su; Chen, L.K.; Cheung, K.W.; Photonics Technology Letters, IEEE vol. 6, Issue 5, May 1994 pp. 664-667.*

Performance of optical direct receivers using noise corrupted decision threshold Menedez-Valdes, P.; Lightwave Technology, Journal of vol. 13, Issue 11, Nov. 1995 pp. 2202-2214.*

* cited by examiner

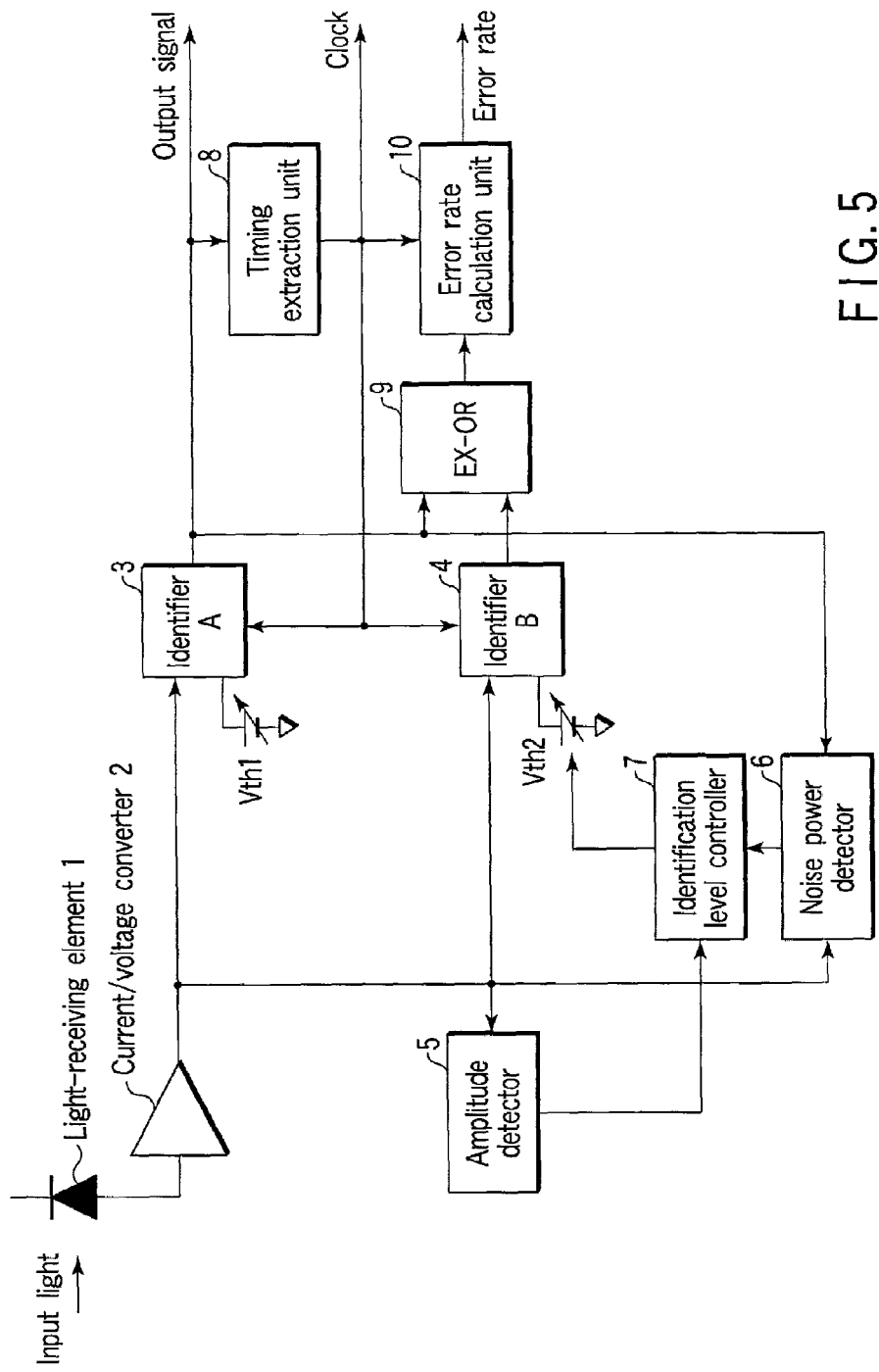
F I G. 5

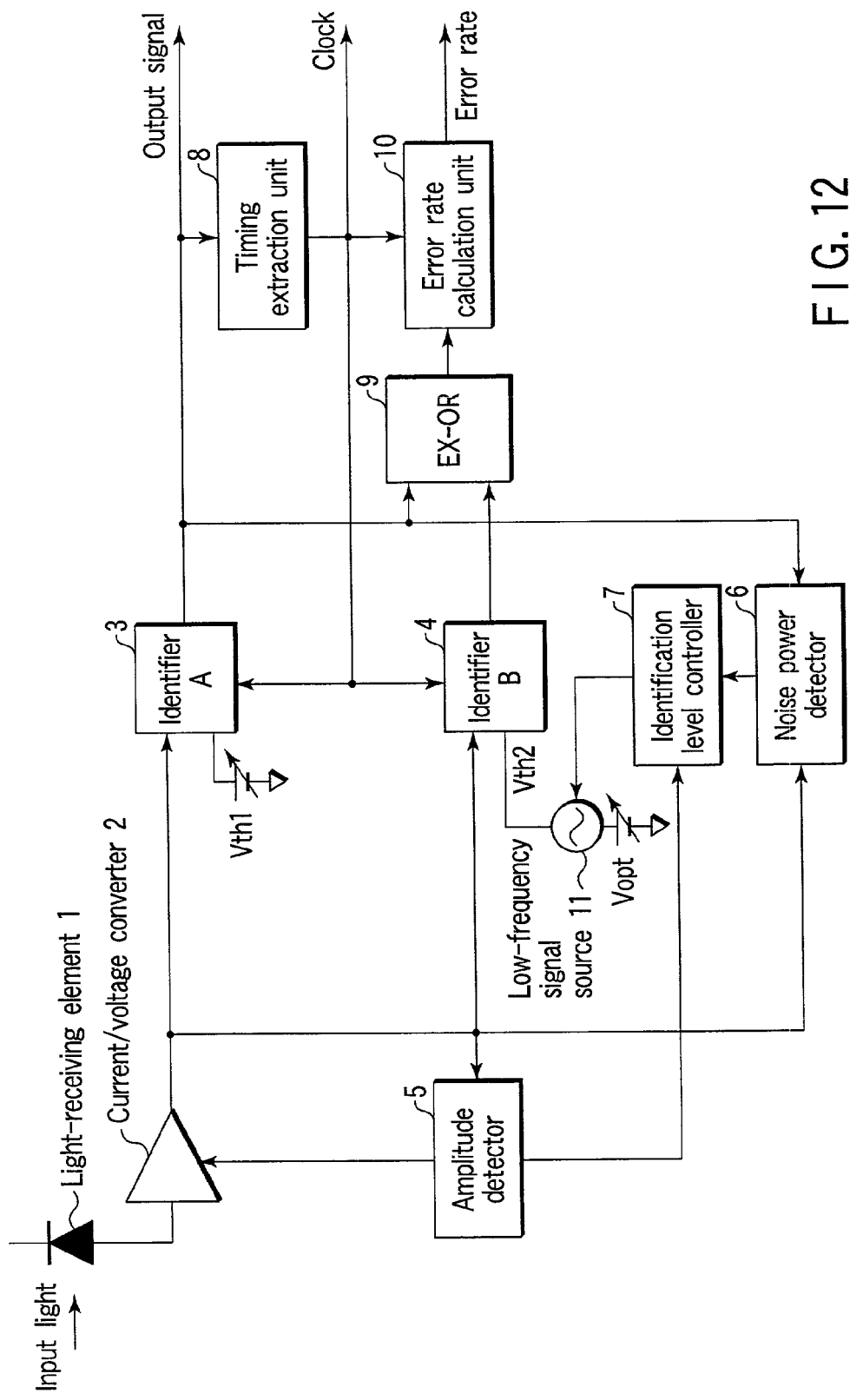
F I G. 12

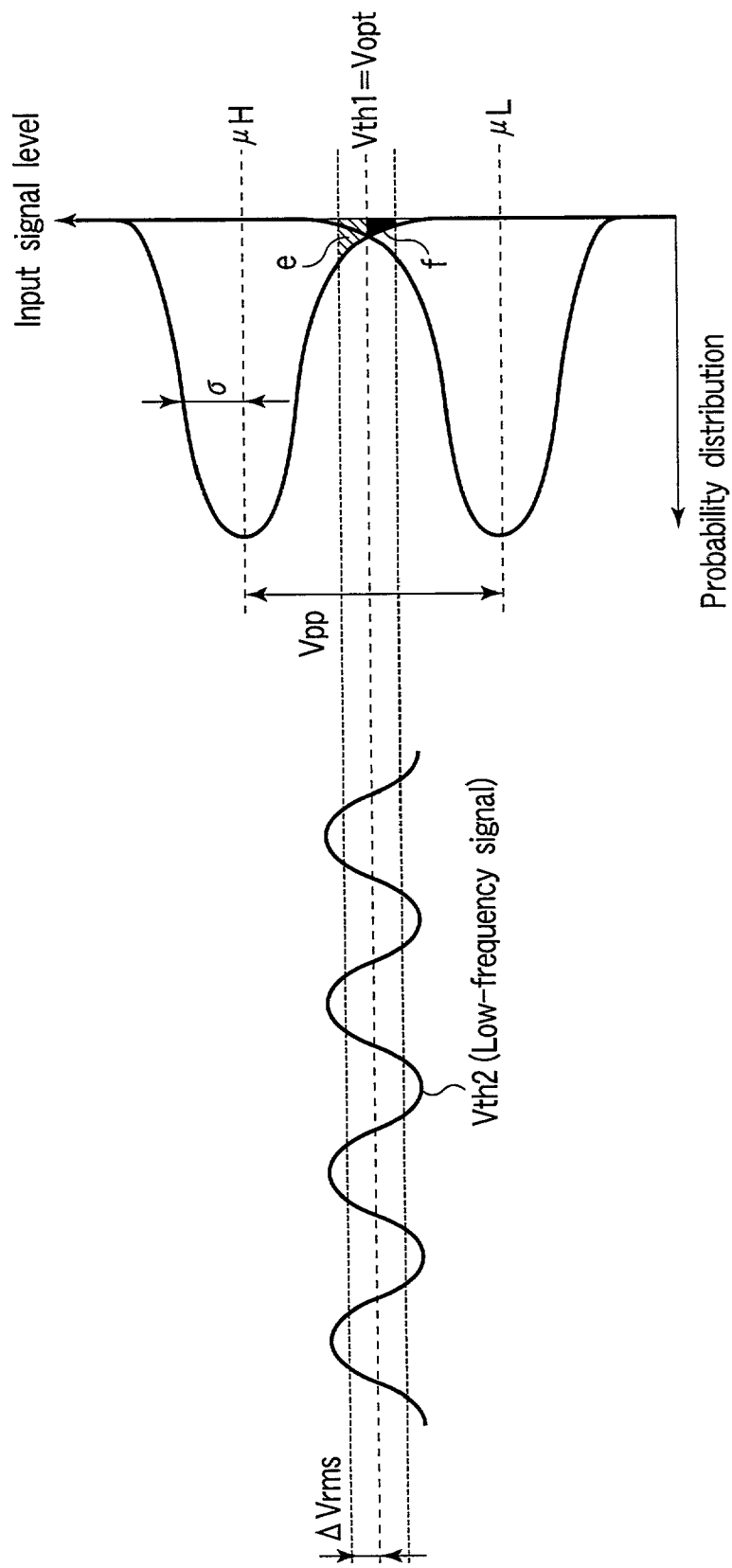
F I G. 13

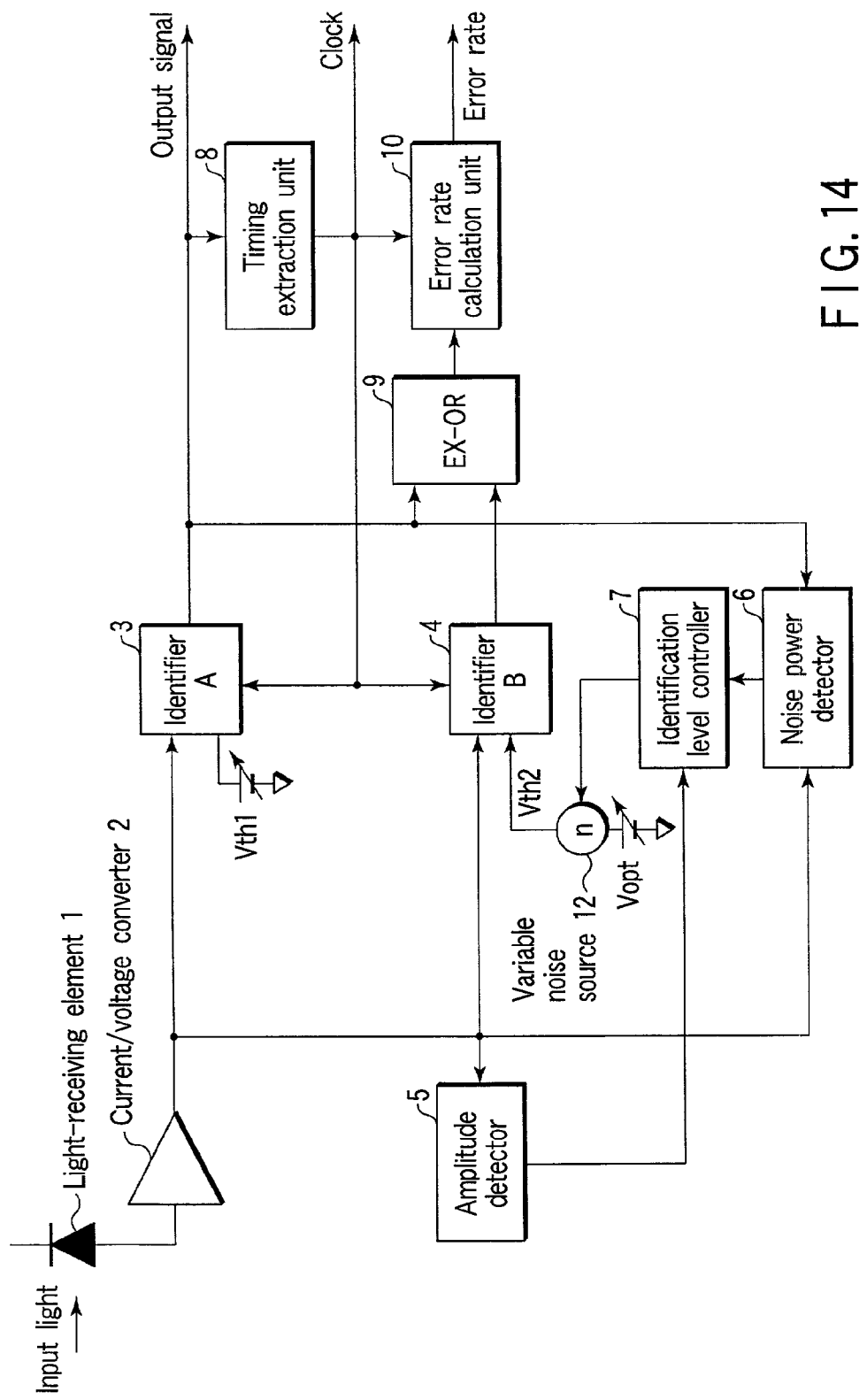
F I G. 14

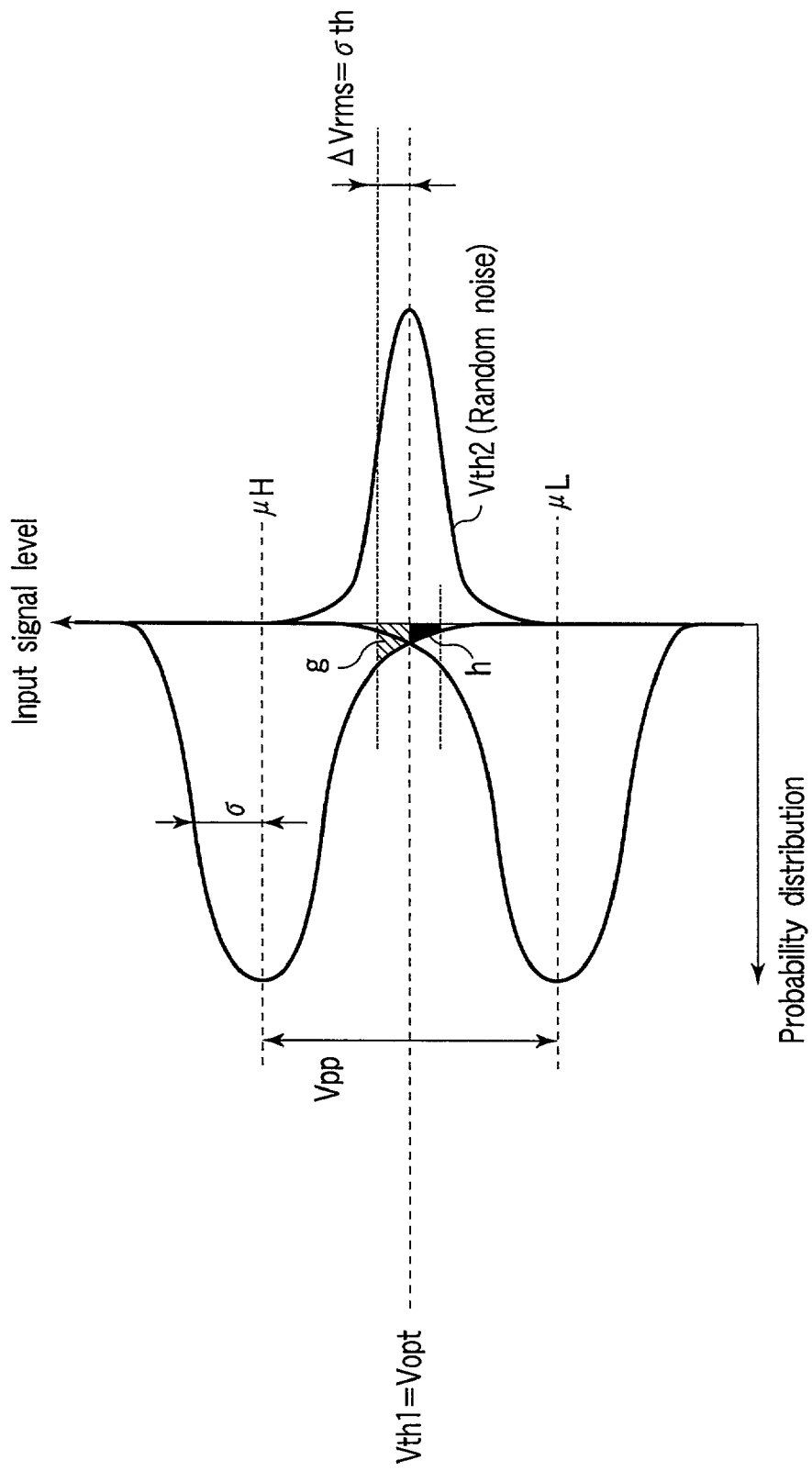
F I G. 15

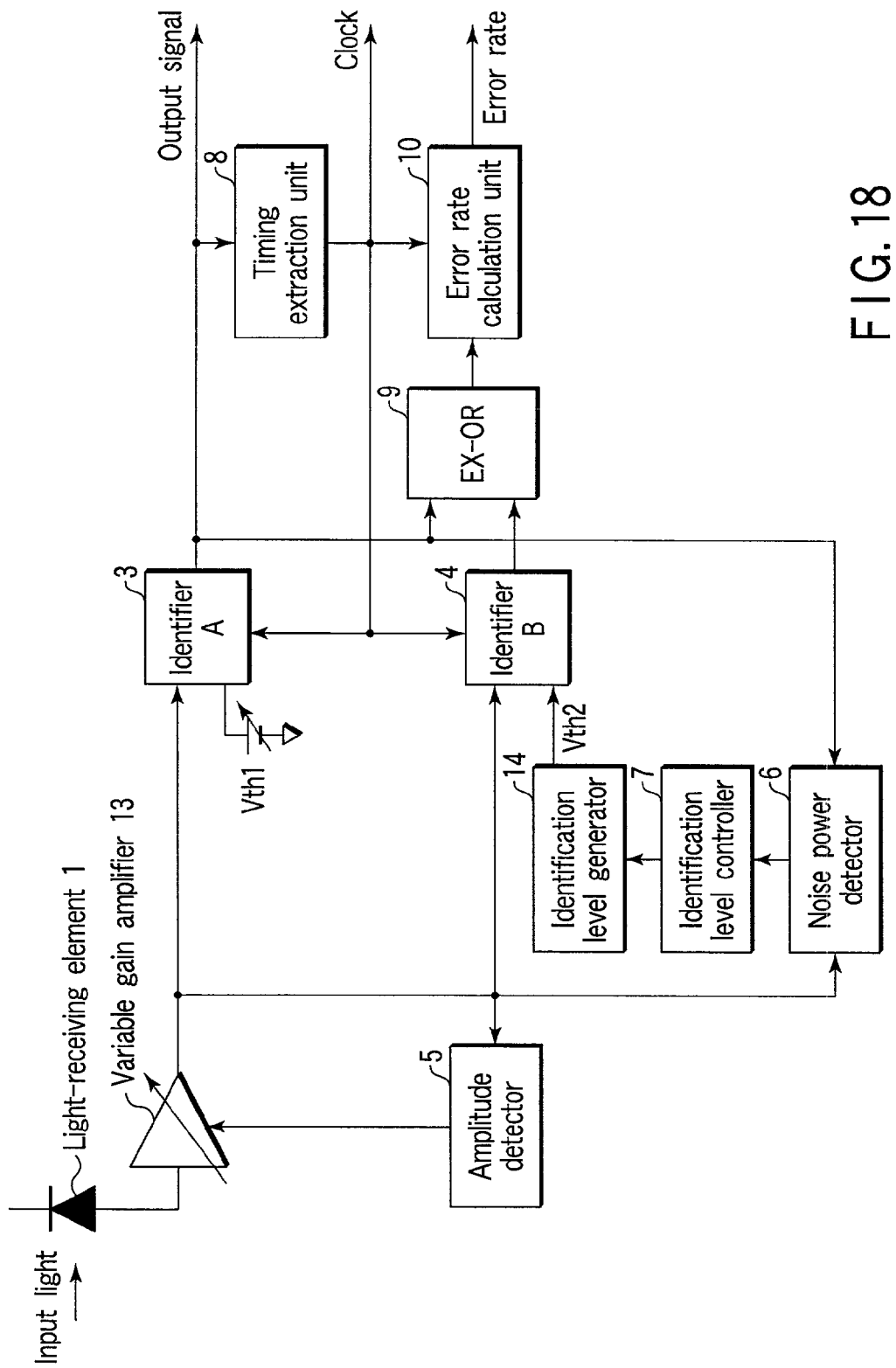
F I G. 18

LINE QUALITY MONITORING APPARATUS AND METHOD

CROSS-REFERENCE TO RELATED APPLICATIONS

This application is based upon and claims the benefit of priority from the prior Japanese Patent Application No. 2001-057125, filed Mar. 1, 2001, the entire contents of which are incorporated herein by reference.

BACKGROUND OF THE INVENTION

1. Field of the Invention

The present invention relates to a line quality monitoring apparatus and method for monitoring the quality of a transmission signal in an optical communication system.

2. Description of the Related Art

An optical communication system uses the following method of monitoring the quality of a transmission signal. That is, the transmitting side sends a data frame appended with an error detection bit, and the receiving side checks the error detection bit of the received data frame. This method is very effective for quality monitor of a transmission signal with a predetermined transmission rate and transmission format. However, it is not easy for a wavelength multiplex optical transmission apparatus capable of multiplexing and transmitting signals to append an error detection bit on the transmitting side irrespective of the transmission rate and transmission format.

By contrast, as a method of monitoring the quality of a transmission signal on only the receiving side without using any error detection bit, a method shown in FIG. 1 is known. Referring to FIG. 1, a received optical signal is converted into a voltage signal via a light-receiving element 101 and current/voltage converter 102. The voltage signal is input to identifiers (A) 103 and (B) 104 in which different identification levels are set. These identifiers compare their identification levels with the level of the received signal to make identification in a phase of a clock extracted by a timing extraction unit 105. The outputs from the identifiers are input to an EX-OR gate 106, and undergo bit comparison. The output from the EX-OR gate 106 and the clock extracted by the timing extraction unit 105 are input to an error rate calculation unit 107 to calculate an error rate.

FIG. 2 shows the relationship between the input signal level and the identification level in the identifier. Both H- and L-levels of the input signal in an identification phase are respectively distributed about average values μH and μL at a given probability density. If Vth1 and Vth2 respectively represent the identification levels of the identifiers (A) 103 and (B) 104, when the level of an input signal in the identification phase falls within the range between Vth1 and Vth2, the output result of the identifier (A) 103 is H level, and that of the identifier (B) 104 is L level. Hence, the two identifiers output different identification results. FIG. 2 indicates an error detection range in the input signal by hatching.

FIG. 3 shows the bit comparison operation. If the identification results of the two identifiers match, the output from the EX-OR gate 106 changes to L level. However, if the identification results are different, the output from the EX-OR gate 106 changes to H level. Hence, when the bit comparison result of the EX-OR gate 106 is H level, the error rate calculation unit 107 counts that bit as an error bit. The error rate calculation unit 107 counts clocks extracted by the timing extraction unit 105, and divides the count result of the error bits by the clock count, thus calculating an error rate.

As techniques associated with a bit comparison scheme, various techniques are known in addition to the above example shown in FIG. 1. For example, Jpn. Pat. Appln. KOKAI Publication No. 2-142247 discloses a fundamental technique, which compares an input signal with a predetermined identification level to identify a code. On the other hand, Jpn. Pat. Appln. KOKAI Publication No. 3-140039 has a function of detecting noise components contained in an input signal by parallelly receiving the input signal by two identifiers (comparators). Also, Jpn. Pat. Appln. KOKAI Publication No. 2000-4260 discloses a technique for checking if a bit of an input signal is H or L level using two bit checking circuits by setting a voltage amplifier threshold value and phase threshold value.

For example, with the arrangement shown in FIG. 1, when the level difference between the two identification levels Vth1 and Vth2 is set to be sufficiently smaller than the input signal amplitude, an actual error rate can be monitored to some extent. However, a setting condition of the identification level difference, which is used to eliminate detection errors of an error rate detected by the bit comparison scheme is not defined.

FIG. 4 shows the calculation result of the relationship between an error rate BER upon identifying at an optimal identification level, and a detection error (DET−BER)/BER of the error rate BER detected by the bit comparison scheme. In this calculation, the mark ratio is set to be ½, and both H and L levels are normal distributions having an identical variance. Also, an optimal identification level Vopt (see FIG. 2) is an intermediate value of average values μH and μL of H and L levels. The identification level of the bit comparison scheme assumes a case wherein Vth1 is set as the optimal identification level Vopt, and a level difference ΔV between Vth1 and Vth2 is set in proportion to an input signal amplitude Vpp.

As can be seen from FIG. 4, if ΔV/Vpp is set to be 1%, the detection error is small for a signal with high line quality around an error rate $10^{-10}$, but the detection error becomes larger with worsening line quality. If ΔV/Vpp is set to be 2%, the detection error is small around an error rate $10^{-6}$, but the detection error becomes larger with changing line quality.

In this way, when the identification level difference ΔV is set in proportion to the input signal amplitude Vpp, line quality cannot be precisely monitored within a broad range (e.g., the error rate range from $10^{-12}$ to $10^{-3}$).

BRIEF SUMMARY OF THE INVENTION

Accordingly, it is an object of the present invention to provide a line quality monitoring apparatus and method, which can improve line quality monitoring precision using the bit comparison scheme.

According to one aspect of the present invention, there is provided a line quality monitoring apparatus, comprising: a clock extraction unit configured to extract a clock from a received signal; a first identifier configured to compare the received signal with a first identification level in a phase of the clock extracted by the clock extraction unit, thereby outputting an identification result; a second identifier configured to compare the received signal with a second identification level in the phase of the clock extracted by the clock extraction unit, thereby outputting an identification result; an EX-OR gate configured to calculate an EX-OR of the identification results of the first and second identifiers; an error rate calculation unit configured to calculate a code error rate on the basis of an output from the EX-OR gate and the clock extracted by the clock extraction unit; an amplitude detector configured to detect an amplitude of the received signal; a noise power detector configured to detect noise power contained in the received signal; and a controller configured to control a difference between the first and second identification levels to be inversely proportional to an output from the amplitude detector and to be proportional to an output from the noise power detector.

According to another aspect of the present invention, there is provided a line quality monitoring apparatus, comprising: a clock extraction unit configured to extract a clock from a received signal; a first identifier configured to compare the received signal with a first identification level in a phase of the clock extracted by the clock extraction unit, thereby outputting an identification result; a second identifier configured to compare the received signal with a second identification level in the phase of the clock extracted by the clock extraction unit, thereby outputting an identification result; an EX-OR gate configured to calculate an EX-OR of the identification results of the first and second identifiers; an error rate calculation unit configured to calculate a code error rate on the basis of an output from the EX-OR gate and the clock extracted by the clock extraction unit; an amplitude detector configured to detect an amplitude of the received signal; a variable gain unit configured to control the amplitude of the received signal to be constant in accordance with a detection result of the amplitude detector; a noise power detector configured to detect noise power contained in the received signal; and a controller configured to control a difference between the first and second identification levels to be proportional to an output from the noise power detector.

According to still another aspect of the present invention, there is provided a line quality monitoring method of detecting a code error rate by identifying a received optical signal using different identification levels and executing bit comparison after identification, the method comprising: detecting an amplitude of the signal; detecting noise power contained in the signal; and controlling a difference between the different identification levels to be inversely proportional to the amplitude of the signal and to be proportional to the noise power of the signal.

According to still another aspect of the present invention, there is provided a line quality monitoring method of detecting a code error rate by identifying a received optical signal using different identification levels and executing bit comparison after identification, the method comprising: controlling an amplitude of the signal to be constant; detecting noise power contained in the signal; and controlling a difference between the different identification levels to be proportional to the noise power of the signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a block diagram showing the arrangement of a line quality monitoring apparatus according to the first embodiment of the present invention;

FIG. 12 is a block diagram showing the arrangement of a line quality monitoring apparatus according to the second embodiment of the present invention;

FIG. 13 is a chart showing the operation principle of the line quality monitoring apparatus in FIG. 12;

FIG. 14 is a block diagram showing the arrangement of a line quality monitoring apparatus according to the third embodiment of the present invention;

FIG. 15 is a chart showing the operation principle of the line quality monitoring apparatus in FIG. 14;

FIG. 18 is a block diagram showing the arrangement of a line quality monitoring apparatus according to the fourth embodiment of the present invention.

DETAILED DESCRIPTION OF THE INVENTION

Figure 1:
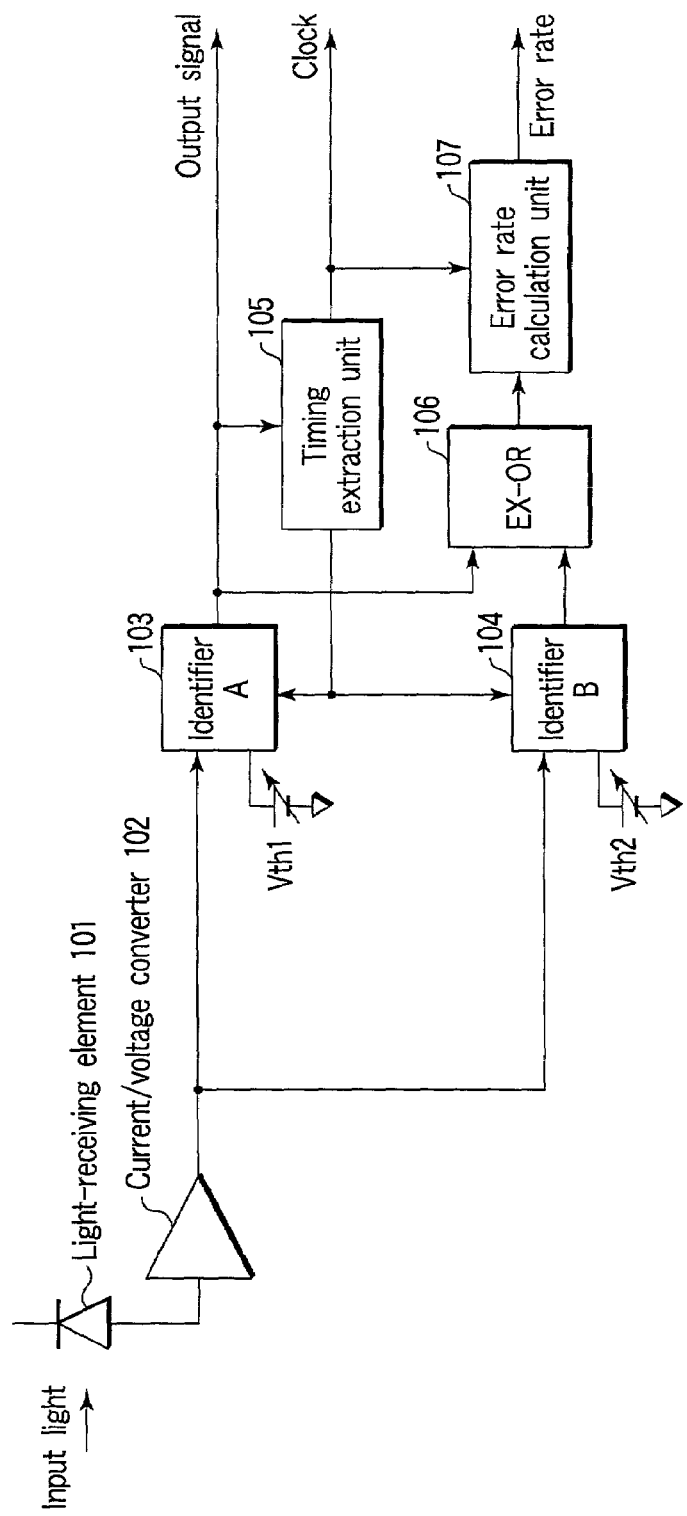
FIG. 1 is a block diagram showing the arrangement of a conventional line quality monitoring apparatus.
Figure 2:
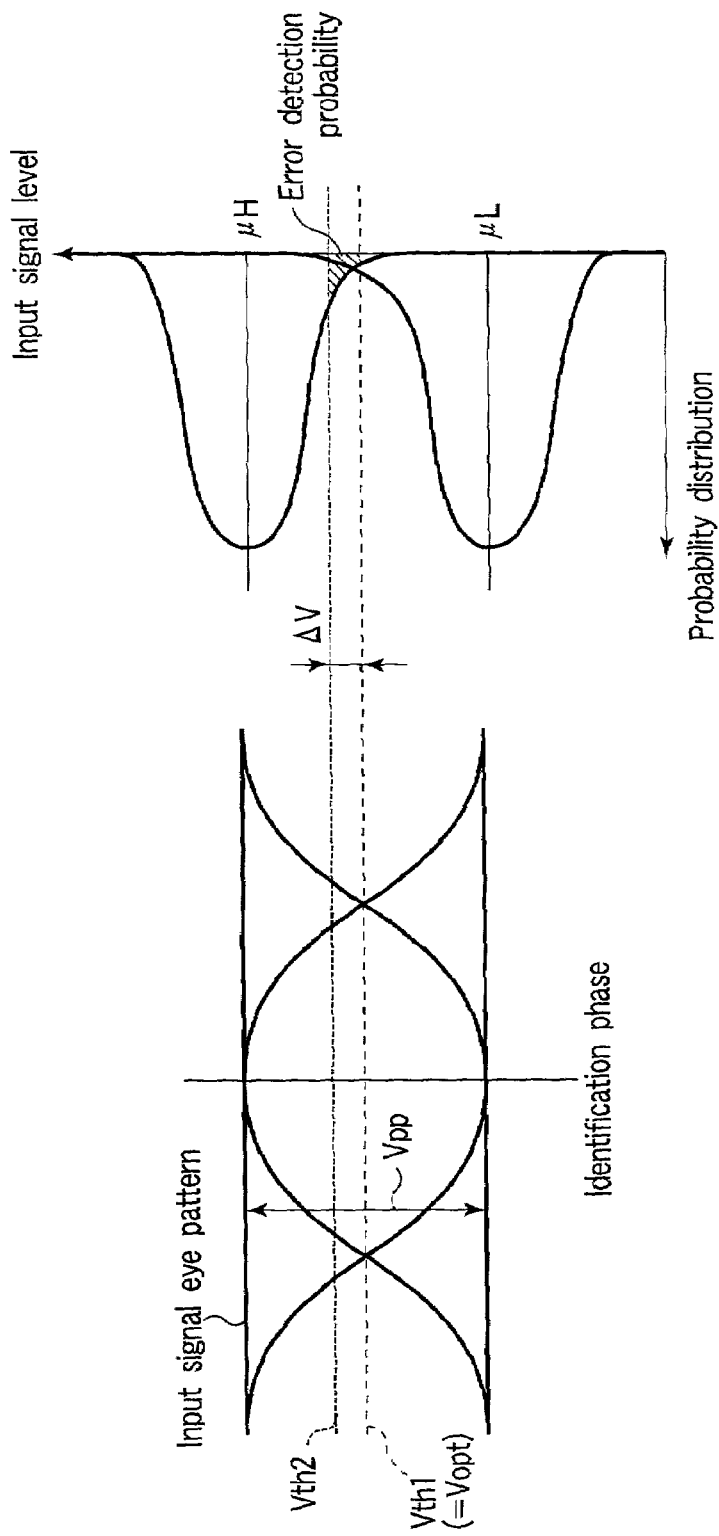
FIG. 2 is a chart showing the relationship between the input signal level and the identification level in an identifier.
Figure 3:
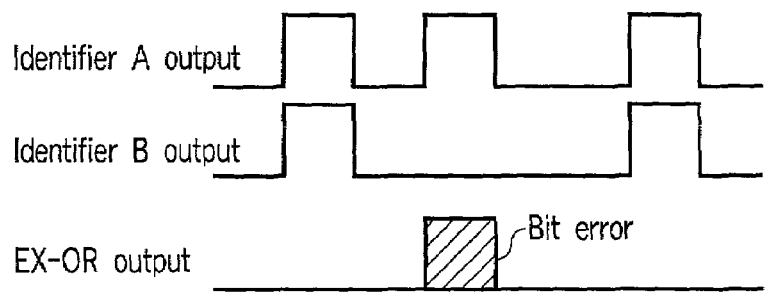
FIG. 3 is a chart for explaining the bit comparison operation.

Embodiments of the present invention will be described hereinafter with reference to the accompanying drawings.

First Embodiment

FIG. 5 shows the arrangement of a line quality monitoring apparatus according to the first embodiment of the present invention.

Referring to FIG. 5, a received optical signal is converted into a voltage signal via a light-receiving element 1 and current/voltage converter 2, and is input to identifiers (A) 3 and (B) 4, in which different identification levels are set, an amplitude detector (amplitude detection circuit) 5, and a noise power detector (noise power detection circuit) 6. This voltage signal will be referred to as an input signal hereinafter.

Identification levels Vth1 and Vth2 of the identifiers (A) 3 and (B) 4 are formed using a DC power supply or the like. Note that the identification level Vth1 of the identifier (A) 3 is set to be an optimal identification level or an intermediate value between H and L levels of an input signal.

The amplitude detector 5 detects the amplitude of the input signal, and outputs a signal indicating the amplitude to an identification level controller 7. The noise power detector 6 detects noise power contained in the input signal, and outputs a signal indicating the noise power to the identification level controller 7.

The identification level controller 7 controls Vth2 so that a level difference ΔV between the identification levels Vth1 and Vth2 of the identifiers (A) 3 and (B) 4 is inversely proportional to the output from the amplitude detector 5 and proportional to the output from the noise power detector 6. This control (including an arithmetic process) can be implemented using, e.g., an analog circuit or software.

The identifiers (A) 3 and (B) 4 respectively compare their identification levels with the level of the received signal to make identification in the phase of a clock extracted by a timing extraction unit (clock extraction circuit) 8. The outputs from the identifiers are input to an EX-OR gate 9, and undergo bit comparison. If the identification results of the two identifiers (A) 3 and (B) 4 match, the output from the EX-OR gate 9 changes to L level. However, if the identification results are different, the output from the EX-OR gate 9 changes to H level.

An error rate calculation unit 10 counts output bits of the EX-OR gate 9 and clocks extracted by the timing extraction unit 8 to calculate an error rate.

Figure 6:
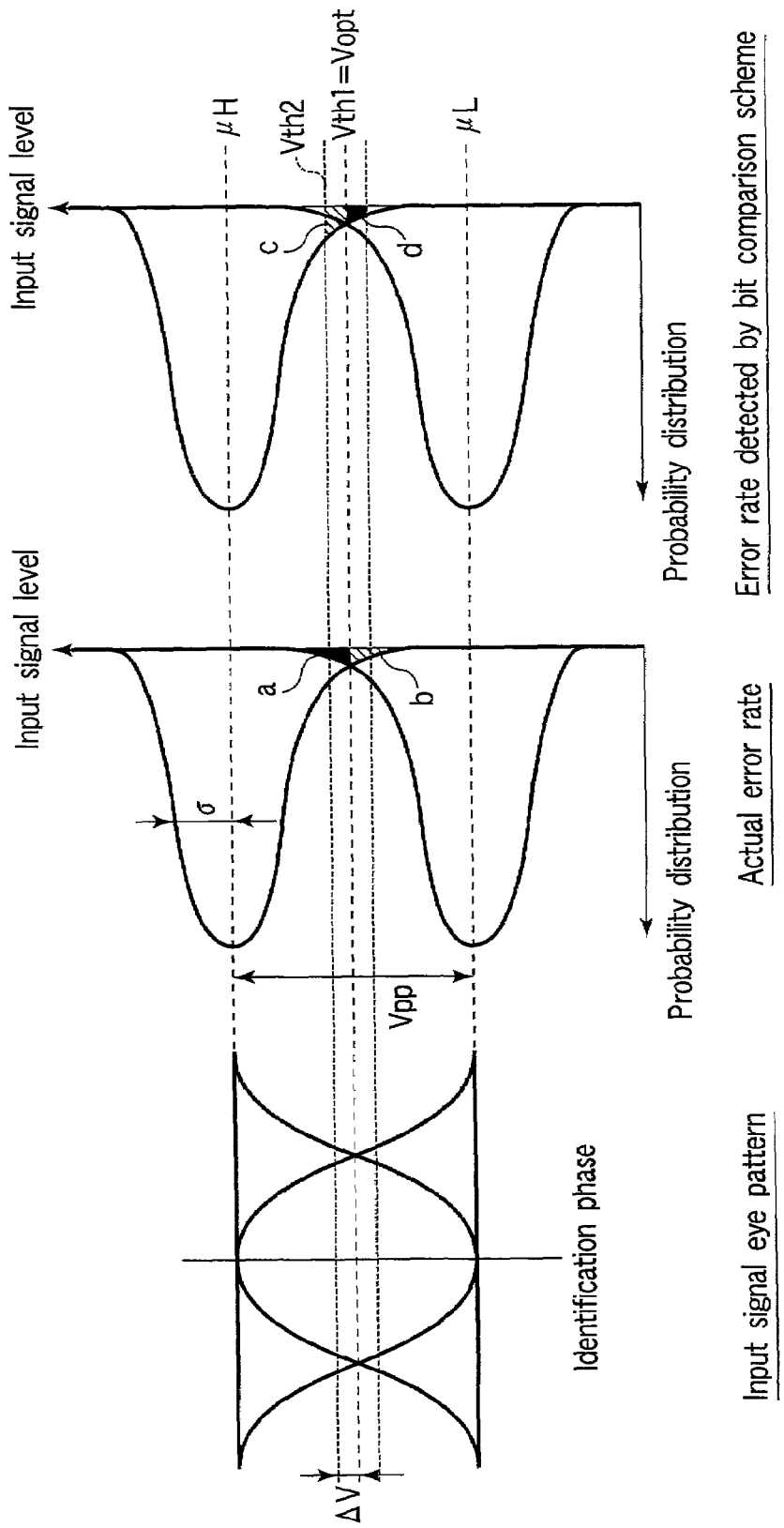
FIG. 6 is a chart showing the relationship between an actual error rate and that detected by the bit comparison scheme.

FIG. 6 shows the relationship between the actual error rate and the error rate detected by the bit comparison scheme. Both H and L levels of the input signal in an identification phase form normal distributions which respectively have average values μH and μL and a variance σ. At this time, an optimal identification level Vopt is an intermediate value between μH and μL.

If identification is made at Vopt, portions a and b of L and H levels in FIG. 6 are respectively detected as errors. Hence, an actual error rate BER is the sum of portions a and b, and is given by:

$$BER = \frac{1}{2}erfc\left(\frac{Vpp}{2\sqrt{2}\,\sigma}\right) \quad (1)$$

where the mark ratio is ½ and Vpp is the level difference between μH and μL, i.e., the input signal amplitude.

In the bit comparison scheme, when the level of the input signal in the identification phase falls within the range between Vth1 and Vth2, the identifiers (A) 3 and (B) 4 output different identification results. The EX-OR gate 9 compares the identification results of the identifiers (A) 3 and (B) 4 for respective bits, and outputs H level if they do not match. Hence, the error rate calculation unit 10 counts that bit since it considers it as an error bit. Portion c of H level in FIG. 6 is detected as an error, and a portion of L level obtained by folding portion d with respect to Vopt is detected as an error. Hence, a detected error rate DET is the sum of portions c and d, and is given by:

$$DET = \frac{1}{4}erfc\left(\frac{Vpp-2\Delta V}{2\sqrt{2}\,\sigma}\right) - \frac{1}{4}erfc\left(\frac{Vpp+2\Delta V}{2\sqrt{2}\,\sigma}\right) \quad (2)$$

For BER<10⁻³ and ΔV <<Vpp by approximation, ΔV (=ΔVopt) that makes equations (1) and (2) equal to each other is given by:

$$\Delta Vopt \approx \frac{2\sigma^2 \sinh^{-1}(1)}{Vpp} \quad (3)$$

As can be seen from equation (3), ΔVopt is inversely proportional to the input signal amplitude Vpp, and is proportional to a square σ² of variance.

Figure 4:
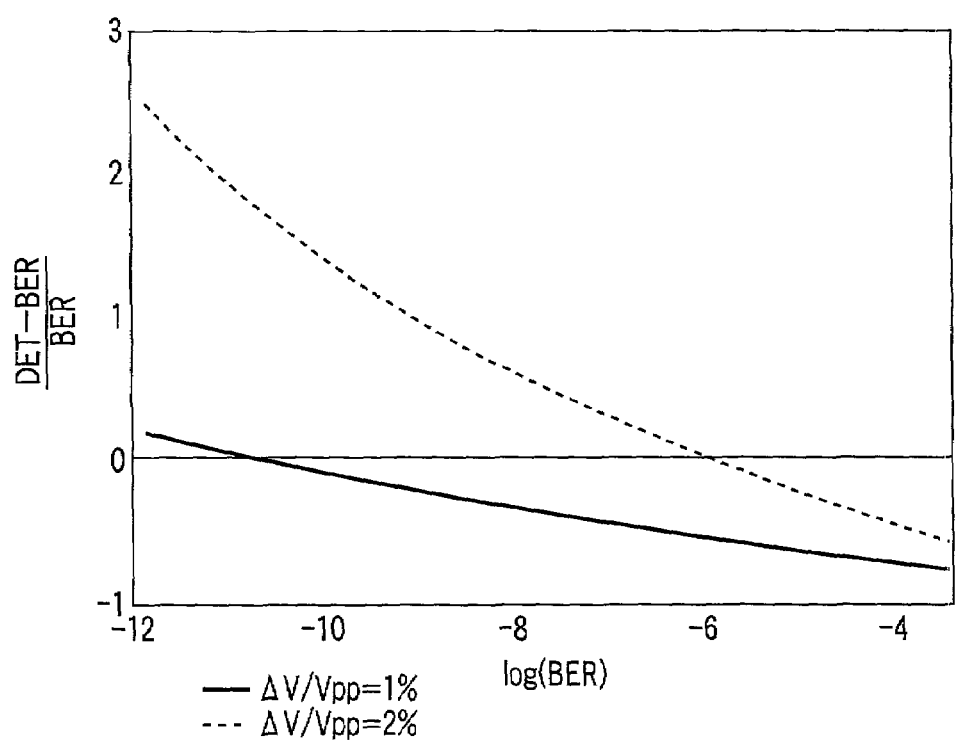
FIG. 4 is a graph showing the calculation result of the relationship between the error rate upon identifying at an optimal identification level and the detection error of an error rate detected by a bit comparison scheme.
Figure 7:
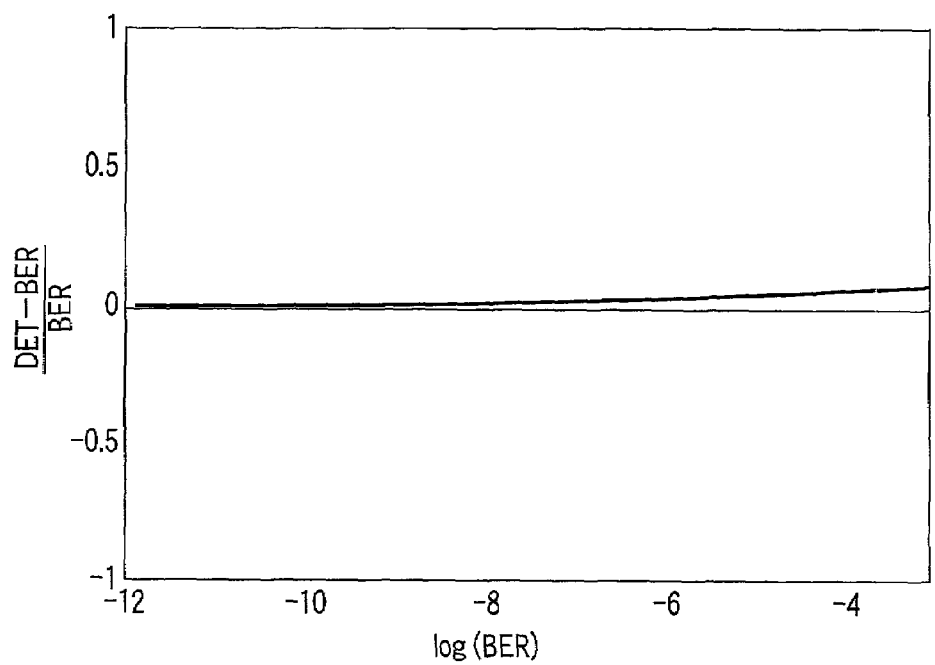
FIG. 7 is a graph showing the calculation result of the relationship between the error rate upon identifying at an optimal identification level, and the detection error.

FIG. 7 shows the calculation result of an error rate BER upon identifying at the optimal identification level, and a detection error (DET−BER)/BER obtained when ΔV is replaced by ΔVopt given by equation (3). As can be seen from comparison between FIGS. 7 and 4, the error rate can be precisely detected over a broad error rate range. Hence, by controlling the identification level Vth2 of the identifier (B) 4 so that ΔV is inversely proportional to the output from the amplitude detector 5 and is proportional to the output from the noise power detector 6, the detection error in the error rate calculation unit 10 can be reduced over a broad error rate range.

Figure 8:
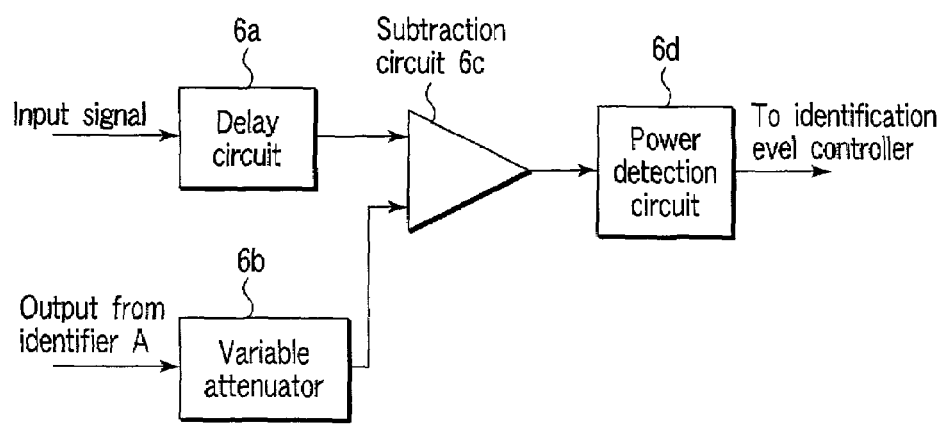
FIG. 8 is a diagram showing the first example of the arrangement of a noise power detector.
Figure 9:
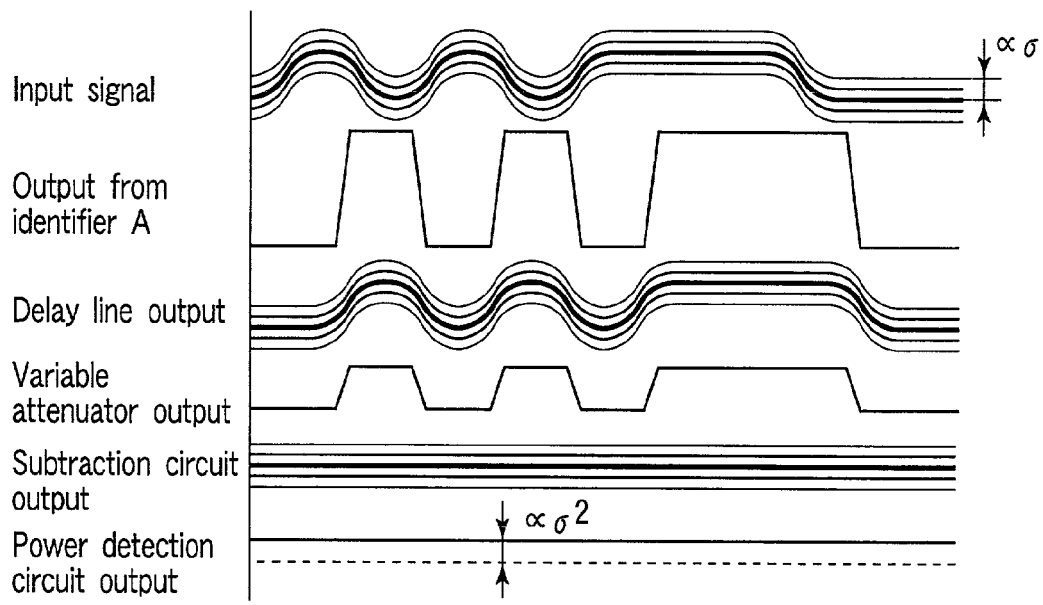
FIG. 9 is a chart for explaining the operation principle of the noise power detector.

FIG. 8 shows the first example of the arrangement of the noise power detector 6, and FIG. 9 shows the operation principle of the noise power detector 6. The input signal is delayed by a delay circuit 6a so as to be in phase with the output from the identifier (A) 3. The output from the identifier (A) 3 is input to a variable attenuator 6b to control the output amplitude of the identifier (A) 3 to have the same level as the amplitude of the input signal. When the input signal and the output from the identifier (A) 3, which are in phase with each other and have the same amplitude, are input to a subtraction circuit 6c, only the signal component is removed from the input signal to extract the noise component alone. The noise component output from the subtraction circuit 6c is input to a power detection circuit 6d to output a voltage proportional to noise power.

Figure 10:
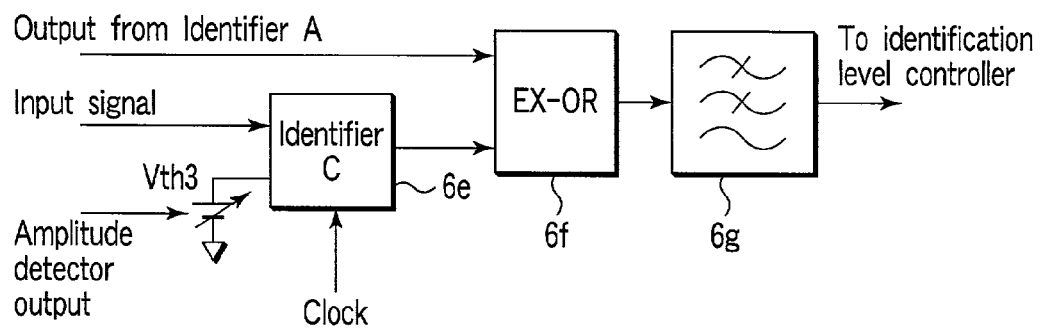
FIG. 10 is a diagram showing the second example of the arrangement of the noise power detector.

FIG. 10 shows the second example of the arrangement of the noise power detector. In this example, the detector comprises an identifier (C) 6e for identifying the input signal using the same identification phase as the identifier (A) 3 and a different identification level Vth3, an EX-OR gate 6f for comparing bits of the output results from the identifiers (C) 6e and (A) 3, and a low-pass filter 6g. When the input signal level falls within the range between the identification levels Vth1 and Vth3, the EX-OR gate 6f outputs pulses. If noise power increases, the number of pulses output from the EX-OR gate 6f also increases. Hence, by obtaining the average value of the outputs from the EX-OR gate 6f using the low-pass filter 6g, a value corresponding to noise power of the input signal can be output.

Figure 11:
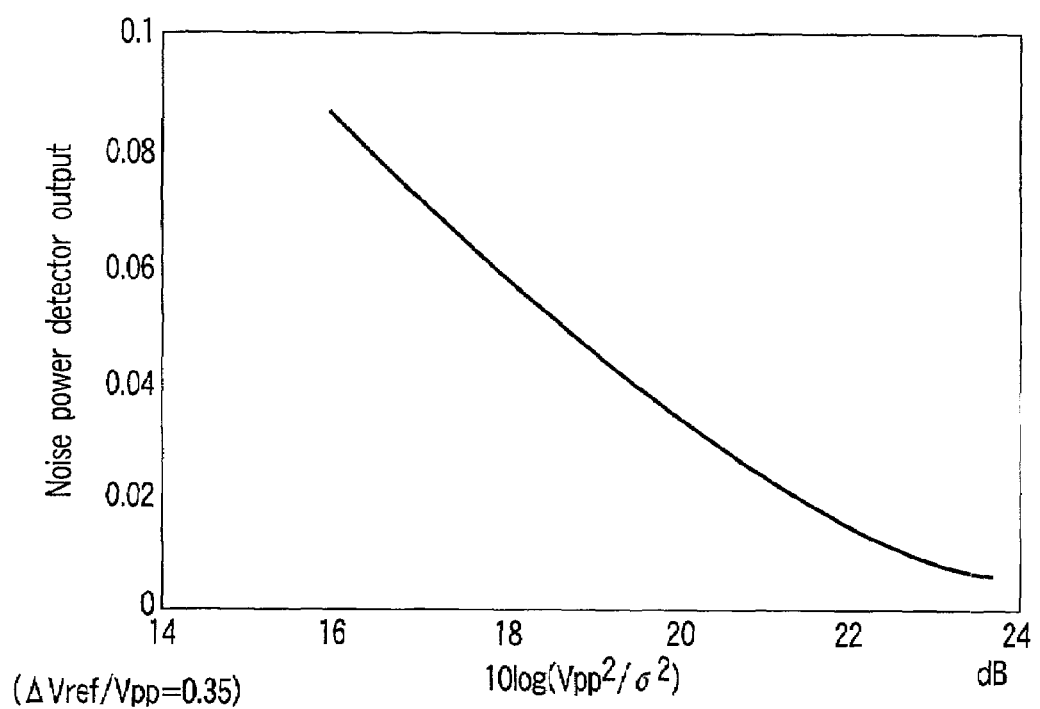
FIG. 11 is a graph showing the calculation result of the output from the noise power detector with respect to a change in signal power to noise power ratio of an input signal.

FIG. 11 shows the calculation result of the output from the noise power detector 6 with respect to a change in signal power to noise power ratio of the input signal when a level difference ΔVref between the identification levels Vth1 and Vth3 is set to be 0.35 times of Vpp. Note that the ordinate of FIG. 11 is normalized to be 1 when the output from the EX-OR gate 6f is H level. Also, the signal power to noise power ratio on the abscissa is calculated within the range of 16 dB to 24 dB corresponding to the error rate range of $10^{-14}$ to $10^{-3}$. As can be seen from FIG. 11, the noise power detector in FIG. 10 can output a voltage corresponding to noise power by setting the ratio of ΔVref to Vpp to be constant.

As described above, according to the first embodiment, the amplitude detector 5 detects the amplitude of the input signal, the noise power detector 6 detects noise power (variance of the signal) contained in the input signal, and the identification level controller 7 controls Vth2 so that the level difference ΔV between the identification levels Vth1 and Vth2 of the identifiers (A) 3 and (B) 4 is inversely proportional to the output from the amplitude detector 5 and proportional to the output from the noise power detector 6. Hence, the detection error can be reduced over a broad error rate range.

Second Embodiment

FIG. 12 shows the arrangement of a line quality monitoring apparatus according to the second embodiment of the present invention. Note that the same reference numerals denote building components common to those in the above embodiment, and a detailed description thereof will be omitted.

The difference from the first embodiment shown in FIG. 5 lies in that the identification level Vth2 of the identifier (B) 4 is formed using a low-frequency signal having Vopt as the center (average value). That is, the identification level controller 7 controls an effective value (or amplitude) of a low-frequency signal generated by a low-frequency signal source 11 to be inversely proportional to the output from the amplitude detector 5 and proportional to the output from the noise power detector 6. The low-frequency signal controlled in this manner is supplied to the identifier (B) 4.

FIG. 13 shows the operation principle of the line quality monitoring apparatus of FIG. 12. As in the first embodiment, when the input signal level falls within the range between the identification levels Vth1 and Vth2, it is detected as an error. Hence, if ΔVrms represents the effective value of a low-frequency signal component, the detected error rate DET corresponds to the sum of portions e and f in FIG. 13 and, from equation (2), it is given by:

$$DET = \frac{1}{4} erfc\left(\frac{Vpp - 2\Delta Vrms}{2\sqrt{2}\sigma}\right) - \frac{1}{4} erfc\left(\frac{Vpp + 2\Delta Vrms}{2\sqrt{2}\sigma}\right) \quad (4)$$

Hence, as in the first embodiment, for BER<$10^{-3}$ and ΔVrms<<Vpp by approximation, ΔVrms (=ΔVrms_opt) that makes equations (1) and (4) equal to each other is similarly given, as in equation (3) above.

For example, when a rectangular pulse signal is used as the low-frequency signal, control can be made to set the amplitude of the rectangular pulse signal to be twice of ΔVopt given by equation (3). When a sine wave is used as the low-frequency signal, control can be made to set the amplitude of the sine wave to be $2^2$ times of ΔVopt given by equation (3). Furthermore, the low-frequency signal may use not only a repetitive waveform but also a pseudo random pattern or low-speed data used in another communication.

As described above, according to the second embodiment, since the identification level Vth2 is formed by controlling the effective value (or amplitude) of the low-frequency signal generated by the low-frequency signal source 11 to be inversely proportional to the output from the amplitude detector 5 and to be proportional to the output from the noise power detector 6, the same effect as in the above embodiment can be obtained.

Third Embodiment

FIG. 14 shows the arrangement of a line quality monitoring apparatus according to the third embodiment of the present invention. Note that the same reference numerals denote building components common to those in the above embodiments, and a detailed description thereof will be omitted.

In FIG. 14, the identification level Vth2 of the identifier (B) 4 is formed using random noise having Vopt as the center (average value). That is, the identification level controller 7 controls a variance of random noise output from a variable noise source 12 to be inversely proportional to the output from the amplitude detector 5 and to be proportional to the output from the noise power detector 6. The random noise controlled in this way is supplied to the identifier (B) 4.

FIG. 15 shows the operation principle of the line quality monitoring apparatus of FIG. 14. As in the first and second embodiments, when the input signal level falls within the range between the identification levels Vth1 and Vth2, it is detected as an error. If the distribution of random noise which forms Vth2 is a normal distribution with a variance σth, the effective value of random noise is σth. Hence, the detected error rate DET corresponds to the sum of portions g and h in FIG. 15 and, from equation (2), it is given by:

$$DET = \frac{1}{4} erfc\left(\frac{Vpp - 2\sigma_{th}}{2\sqrt{2}\sigma}\right) - \frac{1}{4} erfc\left(\frac{Vpp + 2\sigma_{th}}{2\sqrt{2}\sigma}\right) \quad (5)$$

Hence, as in the first and second embodiments, for BER<$10^{-3}$ and σth <<Vpp by approximation, σth (=Δσth_opt) that makes equations (1) and (5) equal to each other is similarly given by equation (3).

Figure 16:
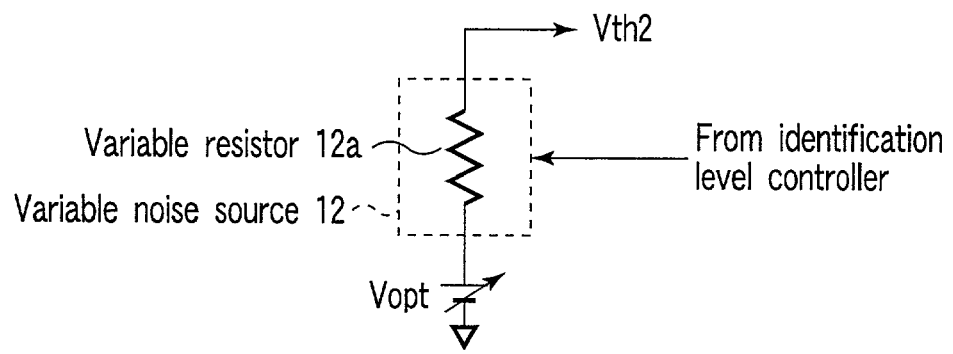
FIG. 16 is a diagram showing the first example of the arrangement of a variable noise source.

FIG. 16 shows the first example of the arrangement of the variable noise source 12. The variable noise source can be implemented by controlling heat noise by changing the resistance of a variable resistor 12a in accordance with the output from the identification level controller 7.

Figure 17:
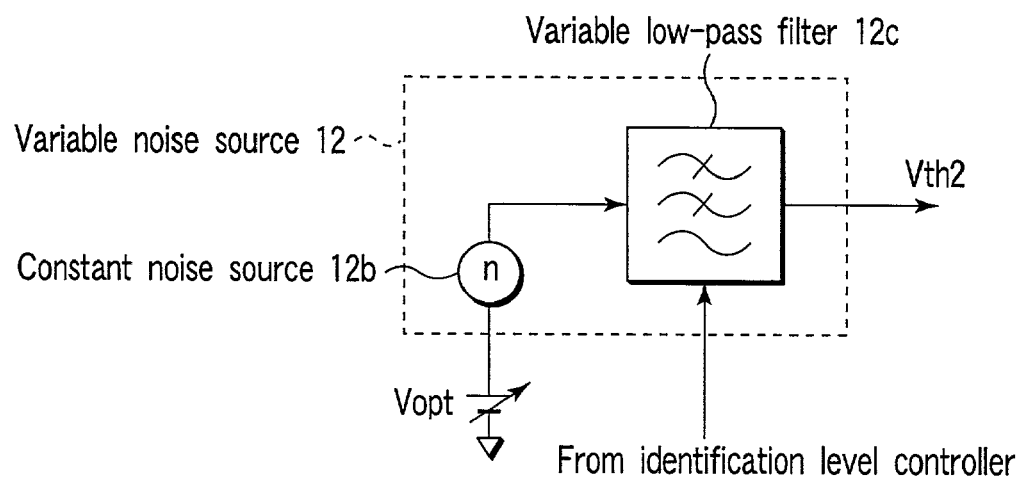
FIG. 17 is a diagram showing the second example of the arrangement of the variable noise source.

FIG. 17 shows the second example of the arrangement of the variable noise source 12. The variable noise source can be implemented by controlling the noise band by changing the band of a low-pass filter 12 in accordance with the output from the identification level controller 7.

As described above, according to the third embodiment, since the identification level Vth2 is formed by controlling the variance of random noise output from the variable noise source 12 to be inversely proportional to the output from the amplitude detector 5 and to be proportional to the output from the noise power detector 6, the same effect as in the above embodiments can be obtained.

Fourth Embodiment

FIG. 18 shows the arrangement of a line quality monitoring apparatus according to the fourth embodiment of the present invention. Note that the same reference numerals denote building components common to those in the above embodiments, and a detailed description thereof will be omitted.

In FIG. 18, a variable gain amplifier 13 is inserted after the current/voltage converter 2, and the gain of the variable gain amplifier 13 is feedback-controlled by the output from the amplitude detector 5, so that the output amplitude of the variable gain amplifier 13 becomes constant. With this arrangement, since the input signal amplitude to the identifiers (A) 3 and (B) 4 becomes constant, the identification level controller 7 controls Vth2 to be proportional to the output from the noise power detector 6, thus obtaining the same effect as in the above embodiments. Note that an identification level generator 14 may use the DC power supply shown in FIG. 5, the low-frequency signal source 11 shown in FIG. 12, or the variable noise source 12 shown in FIG. 14.

Fifth Embodiment

Figure 19:
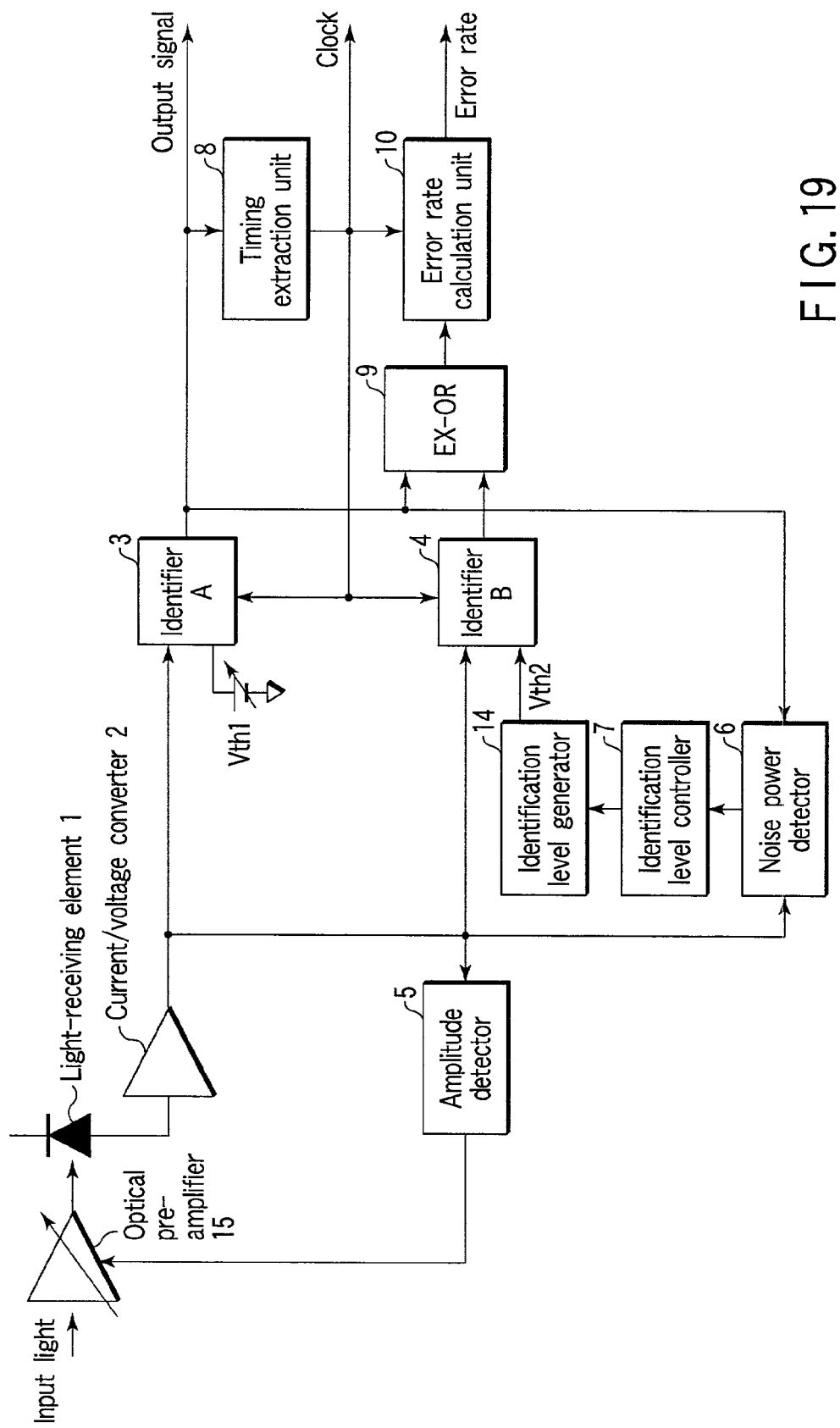
FIG. 19 is a block diagram showing the arrangement of a line quality monitoring apparatus according to the fifth embodiment of the present invention.

FIG. 19 shows the arrangement of a line quality monitoring apparatus according to the fifth embodiment of the present invention. Note that the same reference numerals denote building components common to those in the above embodiments, and a detailed description thereof will be omitted.

In FIG. 19, an optimal pre-amplifier 15 is inserted before the light-receiving element 1, and the gain of the optimal pre-amplifier 15 is controlled to make the amplitude to be detected by the amplitude detector 5 constant. With this arrangement, since the input signal amplitude to the identifiers (A) 3 and (B) 4 becomes constant, the same effect as in the fourth embodiment (FIG. 18) can be obtained. Note that the identification level generator 14 may use the DC power supply shown in FIG. 5, the low-frequency signal source 11 shown in FIG. 12, or the variable noise source 12 shown in FIG. 14.

The present invention is not limited to the above embodiments, and various changes and modifications may be made within the scope of the invention.

As described in detail above, according to the present invention, a line quality monitoring apparatus and method that can precisely detect an error rate over a broad range can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A line quality monitoring apparatus, comprising:
a clock extraction unit configured to extract a clock from a received signal;
a first identifier configured to compare the received signal with a first identification level in a phase of the clock extracted by said clock extraction unit, thereby outputting an identification result;
a second identifier configured to compare the received signal with a second identification level in the phase of the clock extracted by said clock extraction unit, thereby outputting an identification result;
an EX-OR gate configured to calculate an EX-OR of the identification results of said first and second identifiers;
an error rate calculation unit configured to calculate a code error rate on the basis of an output from said EX-OR gate and the clock extracted by said clock extraction unit;
an amplitude detector configured to detect an amplitude of the received signal;
a noise power detector configured to detect noise power contained in the received signal; and
a controller configured to control a difference between the first and second identification levels to be inversely proportional to an output from said amplitude detector and to be proportional to an output from said noise power detector.

2. The apparatus according to claim 1, further comprising a low-frequency signal source configured to output a low-frequency signal, an average value of which is the second identification level, to said second identifier, and
wherein said controller controls an effective value of the low-frequency signal output from said low-frequency signal source to be inversely proportional to the output from said amplitude detector and to be proportional to the output from said noise power detector.

3. The apparatus according to claim 2, wherein the low-frequency signal involves a rectangular wave.

4. The apparatus according to claim 2, wherein the low-frequency signal involves a sine wave.

5. The apparatus according to claim 2, wherein the low-frequency signal involves a pseudo random pattern.

6. A line quality monitoring apparatus, comprising:
a clock extraction unit configured to extract a clock from a received signal;
a first identifier configured to compare the received signal with a first identification level in a phase of the clock extracted by said clock extraction unit, thereby outputting an identification result;
a second identifier configured to compare the received signal with a second identification level in the phase of the clock extracted by said clock extraction unit, thereby outputting an identification result;
an EX-OR gate configured to calculate an EX-OR of the identification results of said first and second identifiers;
an error rate calculation unit configured to calculate a code error rate on the basis of an output from said EX-OR gate and the clock extracted by said clock extraction unit;
an amplitude detector configured to detect an amplitude of the received signal;
a noise power detector configured to detect noise power contained in the received signal;
a controller configured to control a difference between the first and second identification levels to be inversely proportional to an output from said amplitude detector and to be proportional to an output from said noise power detector; and
a variable noise source configured to output noise, an average value of which is the second identification level, to said second identifier, and
wherein said controller controls a variance of the noise output from said variable noise source to be inversely proportional to the output from said amplitude detector and to be proportional to the output from said noise power detector.

7. A line quality monitoring apparatus, comprising:
a clock extraction unit configured to extract a clock from a received signal;
a first identifier configured to compare the received signal with a first identification level in a phase of the clock extracted by said clock extraction unit, thereby outputting an identification result;
a second identifier configured to compare the received signal with a second identification level in the phase of the clock extracted by said clock extraction unit, thereby outputting an identification result;

an EX-OR gate configured to calculate an EX-OR of the identification results of said first and second identifiers;

an error rate calculation unit configured to calculate a code error rate on the basis of an output from said EX-OR gate and the clock extracted by said clock extraction unit;

an amplitude detector configured to detect an amplitude of the received signal;

a noise power detector configured to detect noise power contained in the received signal; and a controller configured to control a difference between the first and second identification levels to be inversely proportional to an output from said amplitude detector and to be proportional to an output from said noise power detector, wherein said noise power detector includes:

a delay circuit configured to adjust phases of the received signal and an output signal of said first identifier;

a variable attenuator configured to adjust amplitudes of the received signal and the output signal of said first identifier;

a subtraction circuit configured to remove a signal component from the received signal, the phase and amplitude of which have been adjusted by said delay circuit and said variable attenuator; and a power detection circuit configured to detect power of an output from said subtraction circuit.

8. A line quality monitoring apparatus, comprising:

a clock extraction unit configured to extract a clock from a received signal;

a first identifier configured to compare the received signal with a first identification level in a phase of the clock extracted by said clock extraction unit, thereby outputting an identification result;

a second identifier configured to compare the received signal with a second identification level in the phase of the clock extracted by said clock extraction unit, thereby outputting an identification result;

an EX-OR gate configured to calculate an EX-OR of the identification results of said first and second identifiers;

an error rate calculation unit configured to calculate a code error rate on the basis of an output from said EX-OR gate and the clock extracted by said clock extraction unit;

an amplitude detector configured to detect an amplitude of the received signal;

a noise power detector configured to detect noise power contained in the received signal; and a controller configured to control a difference between the first and second identification levels to be inversely proportional to an output from said amplitude detector and to be proportional to an output from said noise power detector, wherein said noise power detector includes:

a third identifier configured to compare the received signal with a third identification level in a phase of the clock extracted by said clock extraction unit, thereby outputting an identification result;

a second EX-OR gate configured to calculate an EX-OR of the identification results of said first and third identifiers; and a low-pass filter configured to output an average value of an output from said second EX-OR gate.

9. A line quality monitoring apparatus, comprising:

a clock extraction unit configured to extract a clock from a received signal;

a first identifier configured to compare the received signal with a first identification level in a phase of the clock extracted by said clock extraction unit, thereby outputting an identification result;

a second identifier configured to compare the received signal with a second identification level in the phase of the clock extracted by said clock extraction unit, thereby outputting an identification result;

an EX-OR gate configured to calculate an EX-OR of the identification results of said first and second identifiers;

an error rate calculation unit configured to calculate a code error rate on the basis of an output from said EX-OR gate and the clock extracted by said clock extraction unit;

an amplitude detector configured to detect an amplitude of the received signal;

a variable gain unit configured to control the amplitude of the received signal to be constant in accordance with a detection result of said amplitude detector;

a noise power detector configured to detect noise power contained in the received signal; and a controller configured to control a difference between the first and second identification levels to be proportional to an output from said noise power detector.

10. The apparatus according to claim 9, further comprising a low-frequency signal source configured to output a low-frequency signal, an average value of which is the second identification level, to said second identifier, and wherein said controller controls an effective value of the low-frequency signal output from said low-frequency signal source to be proportional to the output from said noise power detector.

11. The apparatus according to claim 10, wherein the low-frequency signal involves a rectangular wave.

12. The apparatus according to claim 10, wherein the low-frequency signal involves a sine wave.

13. The apparatus according to claim 10, wherein the low-frequency signal involves a pseudo random pattern.

14. A line quality monitoring apparatus, comprising:

a clock extraction unit configured to extract a clock from a received signal;

a first identifier configured to compare the received signal with a first identification level in a phase of the clock extracted by said clock extraction unit, thereby outputting an identification result;

a second identifier configured to compare the received signal with a second identification level in the phase of the clock extracted by said clock extraction unit, thereby outputting an identification result;

an EX-OR gate configured to calculate an EX-OR of the identification results of said first and second identifiers;

an error rate calculation unit configured to calculate a code error rate on the basis of an output from said EX-OR gate and the clock extracted by said clock extraction unit;

an amplitude detector configured to detect an amplitude of the received signal;

a variable gain unit configured to control the amplitude of the received signal to be constant in accordance with a detection result of said amplitude detector;

a noise power detector configured to detect noise power contained in the received signal;

a controller configured to control a difference between the first and second identification levels to be proportional to an output from said noise power detector; and a variable noise source configured to output noise, an average value of which is the second identification level, to said second identifier, and wherein said controller controls a variance of the noise output from said variable noise source to be proportional to the output from said noise power detector.

15. A line quality monitoring apparatus, comprising:
a clock extraction unit configured to extract a clock from a received signal;
a first identifier configured to compare the received signal with a first identification level in a phase of the clock extracted by said clock extraction unit, thereby outputting an identification result;
a second identifier configured to compare the received signal with a second identification level in the phase of the clock extracted by said clock extraction unit, thereby outputting an identification result;
an EX-OR gate configured to calculate an EX-OR of the identification results of said first and second identifiers;
an error rate calculation unit configured to calculate a code error rate on the basis of an output from said EX-OR gate and the clock extracted by said clock extraction unit;
an amplitude detector configured to detect an amplitude of the received signal;
a variable gain unit configured to control the amplitude of the received signal to be constant in accordance with a detection result of said amplitude detector;
a noise power detector configured to detect noise power contained in the received signal; and
a controller configured to control a difference between the first and second identification levels to be proportional to an output from said noise power detector,
wherein said variable gain unit includes a variable gain amplifier.

16. A line quality monitoring apparatus, comprising:
a clock extraction unit configured to extract a clock from a received signal;
a first identifier configured to compare the received signal with a first identification level in a phase of the clock extracted by said clock extraction unit, thereby outputting an identification result;
a second identifier configured to compare the received signal with a second identification level in the phase of the clock extracted by said clock extraction unit, thereby outputting an identification result;
an EX-OR gate configured to calculate an EX-OR of the identification results of said first and second identifiers;
an error rate calculation unit configured to calculate a code error rate on the basis of an output from said EX-OR gate and the clock extracted by said clock extraction unit;
an amplitude detector configured to detect an amplitude of the received signal;
a variable gain unit configured to control the amplitude of the received signal to be constant in accordance with a detection result of said amplitude detector;
a noise power detector configured to detect noise power contained in the received signal; and
a controller configured to control a difference between the first and second identification levels to be proportional to an output from said noise power detector,
wherein said variable gain unit includes an optical pre-amplifier.

17. A line quality monitoring apparatus, comprising:
a clock extraction unit configured to extract a clock from a received signal;
a first identifier configured to compare the received signal with a first identification level in a phase of the clock extracted by said clock extraction unit, thereby outputting an identification result;
a second identifier configured to compare the received signal with a second identification level in the phase of the clock extracted by said clock extraction unit, thereby outputting an identification result;
an EX-OR gate configured to calculate an EX-OR of the identification results of said first and second identifiers;
an error rate calculation unit configured to calculate a code error rate on the basis of an output from said EX-OR gate and the clock extracted by said clock extraction unit;
an amplitude detector configured to detect an amplitude of the received signal;
a variable gain unit configured to control the amplitude of the received signal to be constant in accordance with a detection result of said amplitude detector;
a noise power detector configured to detect noise power contained in the received signal; and
a controller configured to control a difference between the first and second identification levels to be proportional to an output from said noise power detector,
wherein said noise power detector includes:
a delay circuit configured to adjust phases of the received signal and an output signal of said first identifier;
a variable attenuator configured to adjust amplitudes of the received signal and the output signal of said first identifier;
a subtraction circuit configured to remove a signal component from the received signal, the phase and amplitude of which have been adjusted by said delay circuit and said variable attenuator; and
a power detection circuit configured to detect power of an output from said subtraction circuit.

18. A line quality monitoring apparatus, comprising:
a clock extraction unit configured to extract a clock from a received signal;
a first identifier configured to compare the received signal with a first identification level in a phase of the clock extracted by said clock extraction unit, thereby outputting an identification result;
a second identifier configured to compare the received signal with a second identification level in the phase of the clock extracted by said clock extraction unit, thereby outputting an identification result;
an EX-OR gate configured to calculate an EX-OR of the identification results of said first and second identifiers;
an error rate calculation unit configured to calculate a code error rate on the basis of an output from said EX-OR gate and the clock extracted by said clock extraction unit;
an amplitude detector configured to detect an amplitude of the received signal;
a variable gain unit configured to control the amplitude of the received signal to be constant in accordance with a detection result of said amplitude detector;
a noise power detector configured to detect noise power contained in the received signal; and
a controller configured to control a difference between the first and second identification levels to be proportional to an output from said noise power detector,
wherein said noise power detector includes:
a third identifier configured to compare the received signal with a third identification level in a phase of the clock extracted by said clock extraction unit, thereby outputting an identification result;
a second EX-OR gate configured to calculate an EX-OR of the identification results of said first and third identifiers; and
a low-pass filter configured to output an average value of an output from said second EX-OR gate.

* * * * *